March 5, 1929.  C. F. H. BOHNHARDT  1,703,861
FAUCET CONSTRUCTION
Filed July 12, 1923

Inventor
Charles F. H. Bohnhardt,
By his Attorneys
Prindle, Wright, Neal & Bean.

Patented Mar. 5, 1929.

1,703,861

UNITED STATES PATENT OFFICE.

CHARLES F. H. BOHNHARDT, OF BALTIMORE, MARYLAND, ASSIGNOR, BY MESNE ASSIGNMENTS, TO U. S. INDUSTRIAL ALCOHOL CO., A CORPORATION OF WEST VIRGINIA.

FAUCET CONSTRUCTION.

Application filed July 12, 1923. Serial No. 651,067.

My invention relates particularly to faucets which may be used for any desired purpose but which are especially adapted for controlling the supply of water.

The object of my invention is to provide faucets designed to stop the flow of fluid such, for example, as water, when portions of the faucet have been removed for the renewal of the washer therein or other repairs. A further object is to provide a faucet of this type which is adapted to be connected to a vertical water supply pipe. Still another object is to provide a faucet of this kind in which the construction is entirely free from leakage. Still another object is to arrange the parts for adjustment so as to adjust the position of the operating handle according to the pressure of the water supply and according to the degree of wear that has occurred on the washer in the faucet. Further objects of my invention will appear from the detailed description thereof hereinafter.

While my invention is capable of embodiment in many different forms for the purpose of illustration I have shown only one form thereof in the accompanying drawings, in which—

Figure 1:
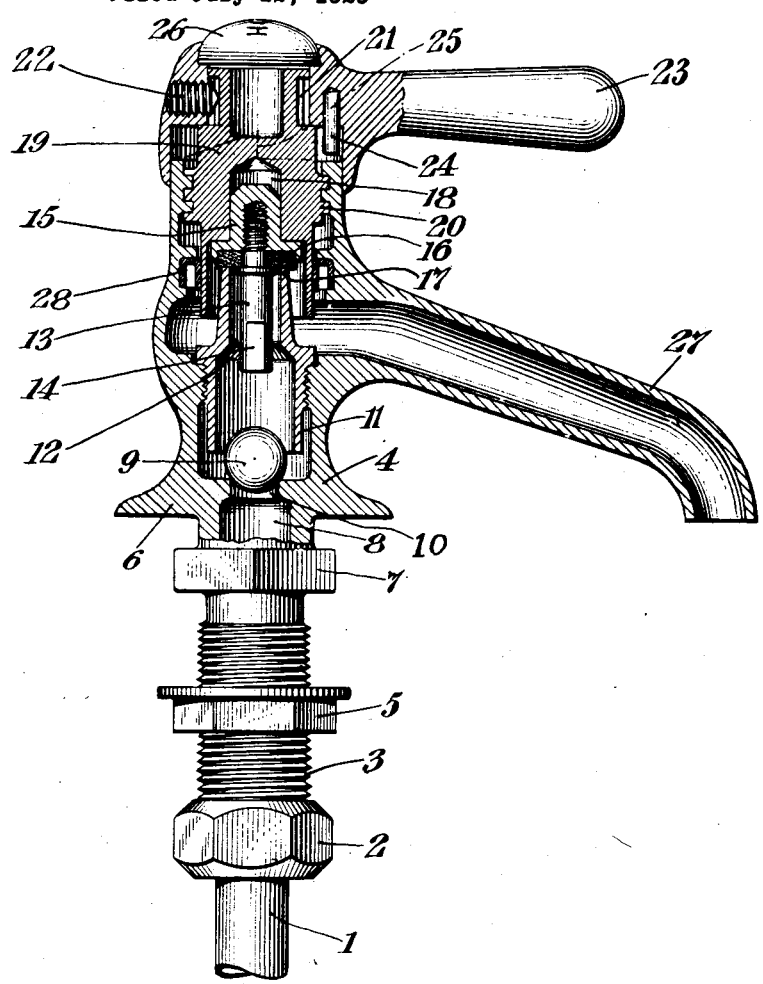
Figure 2:
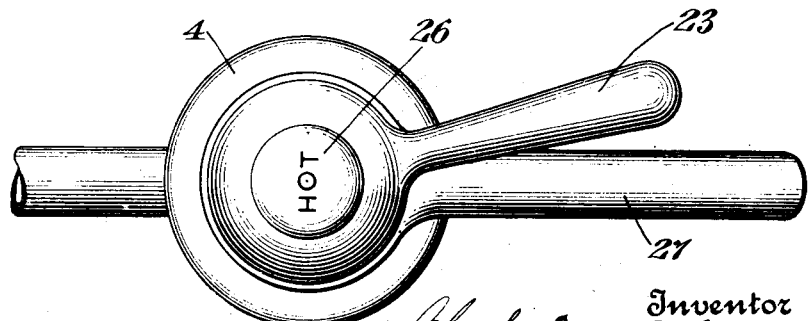

Figure 1 is a vertical section of a faucet made in accordance with my invention, and Figure 2 is a plan view of the same.

In the drawings I have shown a vertical water supply pipe 1 adapted to be connected by a nut 2 to the lower screw-threaded end 3 of a main faucet body 4. Upon the screw-threaded end 3 of the same there is an adjustable nut 5 which is arranged to be screwed upwardly against the underside of a basin or other support for the faucet so as to clamp the faucet in place between the nut 5 and a flange 6 carried by the faucet body. On the faucet body there is, furthermore, provided a square projection 7 to fit in a similar hole in the basin or other support so as to prevent the faucet from turning when being secured in place. A central passageway 8 conducts the water upwardly past a ball-valve 9 which is located above a restriction 10 in the passageway 8. The ball-valve moves within a cage 11 which is screw-threaded to the interior of the faucet body 4, said cage having near the centre of the same an upper valve seat 12 for the ball-valve when the faucet is dismantled for repairs. Normally the ball-valve 9 is prevented from seating against the valve seat 12 by reason of a stem 13, having flat sides 14 to enable its upper end to be screwed into and unscrewed from a washer supporting member 15 thus clamping in place between the stem 13 and the support 15 a washer 16 of fibre or leather or any other similar material. The washer 16 seats against a valve seat 17 on the upper end of the cage 11. The support 15 rests loosely within a recess 18 in a rotatable member 19 having a large screw-thread 20 cooperating with a similar screw-thread on the interior of the faucet body. The rotatable member 19 has at its upper portion a series of recesses or notches 21 to receive a screw 22 carried by a handle 23 which encircles the rotatable member 19, the screw 22 being placed in the particular one of the notches 21 which will give the right adjustment for the flow of water desired and the degree of wear on the washer 16. The degree of flow of the water is controlled in this way through the agency of a stop 24 in the interior of the handle 23 which cooperates with a vertical surface 25 shown in dotted lines in Figure 1 as being located on the upper end of the faucet body 4 but at a point in front of the plane in which the cross-section appearing in Figure 1 has been taken. At the extreme top of the handle 23 there is provided a porcelain button 26 to carry the word "Hot" or the word "Cold" to indicate the temperature of the water supplied by the faucet. The water leaves the faucet by means of a downwardly inclined spout 27 and any leakage of any of the water upwardly through the screw-thread 20 is prevented by the presence of a washer 28 which is U-shaped in cross-section and which expands upon the application of the water pressure so as to provide an increasingly tight joint according to the increase of the pressure of the water.

In the operation of the faucet, normally the water will be cut off by the seating of the washer 16 against the valve seat 17. When it is desired to provide a flow of water from the spout 27 the handle 23 is moved to the fully opened position determined by the contact of the stop 24 with the vertical surface 25. In the meantime water cannot leak upwardly past the screw-thread 20 in view of the washer 28 which effectively prevents any escape of the water in this direction. In this position of the parts the ball-valve 9 will be supported against the lower end of the stem 13, thus preventing its seating against the valve seat 12. When it is desired to renew the washer 16 or to repair the parts in any other way the screw 22 may be removed and the rotatable member 19 rotated to withdraw the same, whereupon the support 15 carrying the washer 16 can be removed so that the washer 16 may be readily replaced thereon by unscrewing and then replacing the stem 13 after having inserted the new washer in place. During the repairing of the parts in this way the ball-valve 9 will have become seated against the valve seat 12, thus effectively preventing the escape of water while the repairs are being made. It will also be understood that the ball-valve 9 and the cage 11 may also be removed for repairs, if desired, by screwing the cage 11 outwardly, the water having been previously cut off for this purpose. It will thus be understood that a faucet constructed in this manner may be readily kept in repair to the extent ordinarily required, by anyone and without the necessity of going to the trouble of first cutting off the water supply.

While I have described my invention above in detail I wish it to be understood that many changes may be made therein without departing from the spirit of the same.

I claim:

1. In a faucet, the combination of a body portion having a connection to a source of supply, an annular packing, a primary valve, a removable valve member comprising a handle and a vertically movable member for controlling the opening of the primary valve having a sleeve extending around the primary valve and cooperating with said packing, a ball shaped secondary valve for cutting off the liquid supply when the first mentioned valve has been removed, said secondary valve having a valve seat, a cage attached to the valve seat and movable therewith within the said body portion against which valve seat the secondary valve is adapted to seat upwardly while being guided by the cage, said valve seat for the secondary valve having an extension adapted to act as a valve seat for the primary valve and said primary valve having a downwardly directed stem to prevent the secondary valve from seating when the primary valve is positioned for operation, and an upwardly directed extension on said primary valve fitting within a recess in the vertically movable member.

2. In a faucet, the combination of a body portion having a connection to a source of supply, an annular packing, a primary valve, a removable valve member comprising a handle and a vertically movable member for controlling the opening of the primary valve having a sleeve extending around the primary valve and cooperating with said packing, a ball shaped secondary valve for cutting off the liquid supply when the first mentioned valve has been removed, said secondary valve having a valve seat, a surrounding valve guiding cage larger in diameter than said secondary valve attached to the valve seat and movable therewith within the said body portion against which valve seat the secondary valve is adapted to seat upwardly while being guided by the cage, said valve seat for the secondary valve having an extension adapted to act as a valve seat for the primary valve, said primary valve having a flattened stem to prevent the secondary valve from seating when the primary valve is positioned for operation, and an upwardly directed extension on said primary valve fitting within a recess in the vertically movable member.

In testimony that I claim the foregoing, I have hereunto set my hand this 5th day of July, 1923.

CHARLES F. H. BOHNHARDT.